(12) United States Patent
Chen et al.

(10) Patent No.: US 7,092,380 B1
(45) Date of Patent: Aug. 15, 2006

(54) METHOD AND SYSTEM FOR PROVIDING VOICE COMMUNICATION OVER DATA NETWORKS

(75) Inventors: Michael C. Chen, San Jose, CA (US); Jan Fandrianto, Los Gatos, CA (US); Chun-Chau Lin, Cupertino, CA (US); Michael P. Sadikun, San Jose, CA (US); Budi Sutardja, Scotts Valley, CA (US); Ramah Sutardja, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/543,381

(22) Filed: Apr. 5, 2000

Related U.S. Application Data

(60) Provisional application No. 60/166,085, filed on Nov. 17, 1999, provisional application No. 60/161,168, filed on Oct. 22, 1999.

(51) Int. Cl.
*H04L 12/66* (2006.01)
(52) U.S. Cl. ....................................................... 370/352
(58) Field of Classification Search ................ 370/352, 370/353, 354, 355, 401, 465, 466; 4/4
See application file for complete search history.

(56) References Cited

U.S. PATENT DOCUMENTS

| | | | |
|---|---|---|---|
| 6,011,794 A | 1/2000 | Mordowitz et al. | |
| 6,064,653 A * | 5/2000 | Farris | 370/237 |
| 6,078,579 A * | 6/2000 | Weingarten | 370/352 |
| 6,137,792 A * | 10/2000 | Jonas et al. | 370/354 |
| 6,192,045 B1* | 2/2001 | Williams et al. | 370/352 |
| 6,243,376 B1* | 6/2001 | Ng et al. | 370/352 |
| 6,282,192 B1* | 8/2001 | Murphy et al. | 370/352 |
| 6,324,280 B1* | 11/2001 | Dunn et al. | 370/352 |
| 6,377,570 B1* | 4/2002 | Vaziri et al. | 350/352 |
| 6,424,647 B1* | 7/2002 | Ng et al. | 370/352 |
| 6,430,178 B1* | 8/2002 | Yahiro | 370/356 |
| 6,452,922 B1* | 9/2002 | Ho | 370/352 |
| 6,473,423 B1* | 10/2002 | Tebeka et al. | 370/352 |
| 6,480,581 B1* | 11/2002 | Wu et al. | 370/352 |
| 6,490,274 B1* | 12/2002 | Kim | 370/352 |
| 6,539,077 B1* | 3/2003 | Ranalli et al. | 379/67.1 |
| 6,542,498 B1* | 4/2003 | Socaciu | 370/352 |
| 6,584,094 B1* | 6/2003 | Maroulis et al. | 370/352 |
| 6,603,758 B1* | 8/2003 | Schmuelling et al. | 370/352 |
| 6,763,020 B1* | 7/2004 | Hon | 370/352 |
| 6,819,663 B1* | 11/2004 | Komuro | 370/352 |
| 6,907,034 B1* | 6/2005 | Begis | 370/352 |
| 6,944,151 B1* | 9/2005 | Menard | 370/356 |

FOREIGN PATENT DOCUMENTS

| | | | |
|---|---|---|---|
| WO | 9811704 | * | 3/1998 |
| WO | WO 98/13986 | | 4/1998 |

OTHER PUBLICATIONS

Aplio, "Aplio/Phone Summary," web site (www.aplio.com/phone/ctSummary.htm).

* cited by examiner

OTHER PUBLICATIONS

Apolio, "Internet Phone PSTN," web site (www.aplio.com/appliance/app04/app04.htm).

(Continued)

*Primary Examiner*—Steven Nguyen
(74) *Attorney, Agent, or Firm*—Baker Botts L.L.P.

(57) ABSTRACT

A method and system are disclosed in which an Internet subscriber can establish real-time voice conversations over the Internet. By performing a call negotiation scheme to identify and locate the other calling party, an Internet telephone can establish a voice communication channel over the Internet to a telephony or computer device.

31 Claims, 16 Drawing Sheets

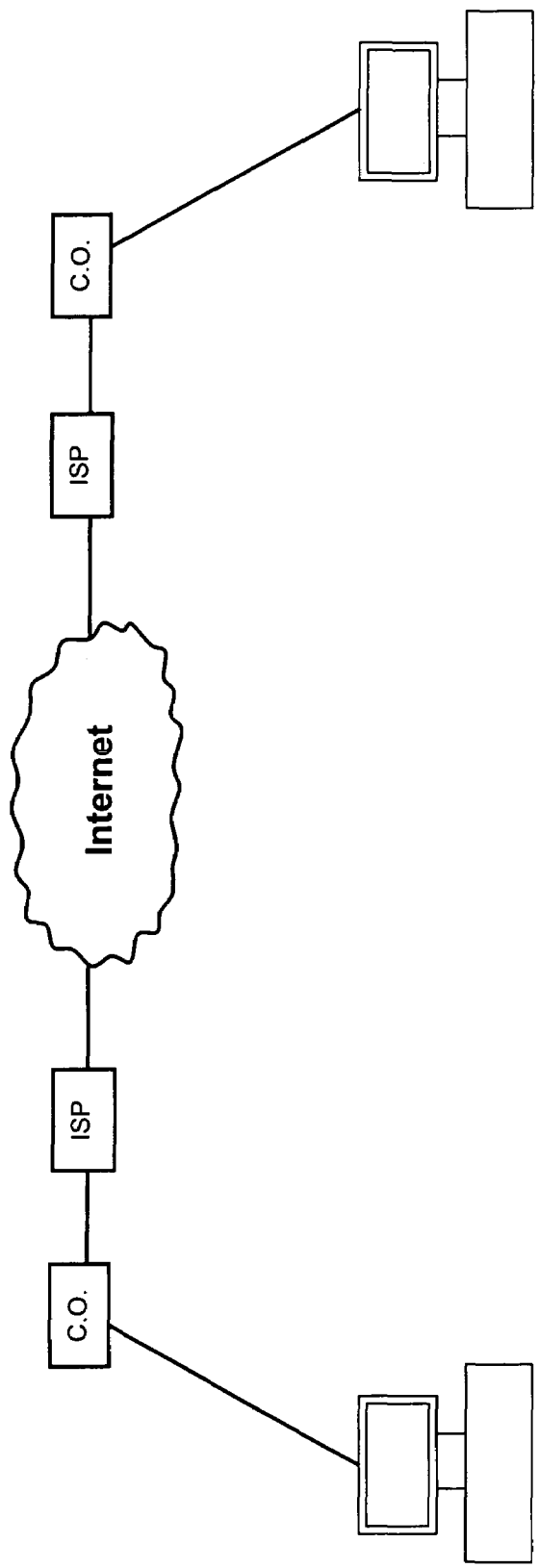
FIG. 1 -- Prior Art

| Identification Number | IP Address | Conference Call Feature Available | Caller ID Feature Available | Call Transfer Feature Available |
|---|---|---|---|---|
| 0010887731 | 193.30.19.0 | Yes | Yes | Yes |
| 0024456891 | 201.19.874.101 | Yes | Yes | No |
| 0000384445 | 198.55.74.0 | No | No | No |
| 0025438984 | 193.30.20.105 | Yes | No | Yes |
| ⋮ | ⋮ | ⋮ | ⋮ | ⋮ |
| 0049844948 | 255.255.20.40 | Yes | No | No |
| ⋮ | ⋮ | ⋮ | ⋮ | ⋮ |

METHOD AND SYSTEM FOR PROVIDING VOICE COMMUNICATION OVER DATA NETWORKS

RELATED APPLICATIONS

This application claims priority to U.S. Application Ser. Nos. 60/161,168, filed on Oct. 22, 1999; and 60/166,085, filed on Nov. 17, 1999, the entire contents of which are incorporated herein by reference.

BACKGROUND OF THE INVENTION

1. Field of the Invention

The invention relates to a system and method for providing voice communication to subscribers over data networks.

2. Brief Description of the Related Art

Networks carry three types of information: voice, video, and data. Historically, these different forms of information have been transported over different networks. Specifically, the telephone network delivered voice information; private corporate networks delivered data information; and broadcast networks delivered video information. Each service was provided by a specific form of infrastructure—the telephone network used copper wires to reach subscribers, broadcast television used the airwaves, cable television used coaxial cable, and so forth.

With advances in technology, the different forms of information can now be carried by any delivery platform. For example, telephony services (i.e., voice and facsimile) can be transported over data networks, such as the Internet.

"Internet telephony" refers to the transfer of voice information using the Internet protocol (IP) of the TCP/IP or UDP/IP protocol suite. Internet telephony uses the Internet to simulate a telephone connection between two Internet users and to bypass the local exchange carriers' and interexchange carrier's telephone networks. Internet telephony works by converting voices into data which can be compressed and split into packets. These data packets are sent over the Internet like any other packets and reassembled as audio output at the receiving end. The ubiquitous nature of the Internet allows a user to complete such Internet telephone connections to many countries around the world. Accordingly, by using the Internet to provide telephony services, the user can avoid paying per-minute toll charges assessed by the user's local exchange carrier and/or interexchange carrier. Rather, the user is subject to only his or her local Internet connection fees. The result may be considerable savings when compared to international telephone rates.

In addition, the Internet utilizes "dynamic routing," wherein data packets are routed using the best routing available for a packet at a particular moment in time, given the current traffic patterns. This system allows many different communications to be routed simultaneously over the same transmission facilities. In contrast, a circuit-switched telephone network, such as the public switched telephone network (PSTN), establishes dedicated, end-to-end transmission paths. Consequently, the Internet allows network resources to be used more efficiently.

Most existing dial-up systems require both parties to be connected to the Internet through a multimedia personal computer to establish an Internet telephone call. As shown in FIG. 1, the multimedia personal computers, which have been loaded with certain telephony software, can access the data network using a local circuit-switched telephone network to a voice over packet gateway residing in an Internet Service Provider (ISP) point of presence.

The typical multimedia personal computer system used for Internet telephony includes a personal computer, a monitor, an analog-voice-to-digital-signal and digital-signal-to-analog-voice converter (converter), Internet telephone software, a full-duplex sound card, a microphone, speakers, and a 28 Kbps or higher rate modulation/demodulation (modem) device. As such, the multimedia personal computer system includes several components or devices and is not easily portable, which may be undesirable for travelling business people. Further, such a personal computer system may be expensive to set up and maintain.

Accordingly, it would be desirable to provide a method and system for voice communication over a data network that addresses the drawbacks of known systems.

SUMMARY OF THE INVENTION

The present invention relates to a method and system for providing voice communication over data networks. The system according to the present invention allows subscribers using Internet telephones to conduct real-time voice conversations over a data network and/or over a circuit switched network.

In accordance with one aspect of the present invention, a method for establishing voice communication between a first and a second station over a data network includes the steps of receiving a data network address for the first station at a second station via a first communication channel, disconnecting the first station and the second station from that first communication channel, and establishing a second communication channel between the first and the second stations whereby the station users can conduct voice communication over the data network. The second communication channel is established by using the data network address received at the second station.

In accordance with an additional aspect of the present invention, a device for initiating voice communication with a second device includes a storage medium having a plurality of programming modules and a single activation means for causing the device to establish a communication channel over a data network. When the single activation means has not been activated, the communication channel between the devices is established over a circuit switched network. The single activation means may include, but is not limited to, a programmable button, a movable switch, voice activation, or movement sensor activation.

In accordance with a further aspect of the invention, a device for establishing voice communication with a second device includes a compatibility module, for determining whether the second device can support voice communication over a data network, and a call initialization module. If the second device supports voice communication over a data network, the call initialization module automatically transmits a command which causes a communication channel to be established between the Internet telephonic device and the second device over a data network.

In accordance with yet another aspect of the invention, a network server located on a data network includes a storage medium having a plurality of programming modules and a channel establishment module. One programming module, the registration module, registers a code and a data network address into a memory in response to receiving a register command signal. The code uniquely identifies a calling station connected to the data network. A second programming module, the address query module, causes a search for the code to be performed on the memory in response to receiving a search command signal. A third programming module, the address mapping module, identifies the data network address based on the search results.

The present invention provides advantages of establishing real-time voice communication channels over the Internet, and thereby avoid paying per-minute toll charges assessed by local or inter-exchange telephone carriers. In addition, the present invention enables a user to conduct voice conversations over the Internet without having to purchase and assemble the many components and devices required in a multimedia personal computer system.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 1 illustrates multimedia personal computer systems connected over the Internet in accordance with the prior art;

FIG. 2b illustrates a first embodiment of the Internet telephone call system of FIG. 2a;

FIG. 2c illustrates a second and alternative embodiment of the Internet telephone call system of FIG. 2a;

FIG. 2d illustrates a third and alternative embodiment of the Internet telephone call system of FIG. 2a;

FIG. 2e illustrates a fourth and yet further alternative embodiment of the Internet telephone call system of FIG. 2a;

DETAILED DESCRIPTION OF THE PREFERRED EMBODIMENTS

Figure 2A:
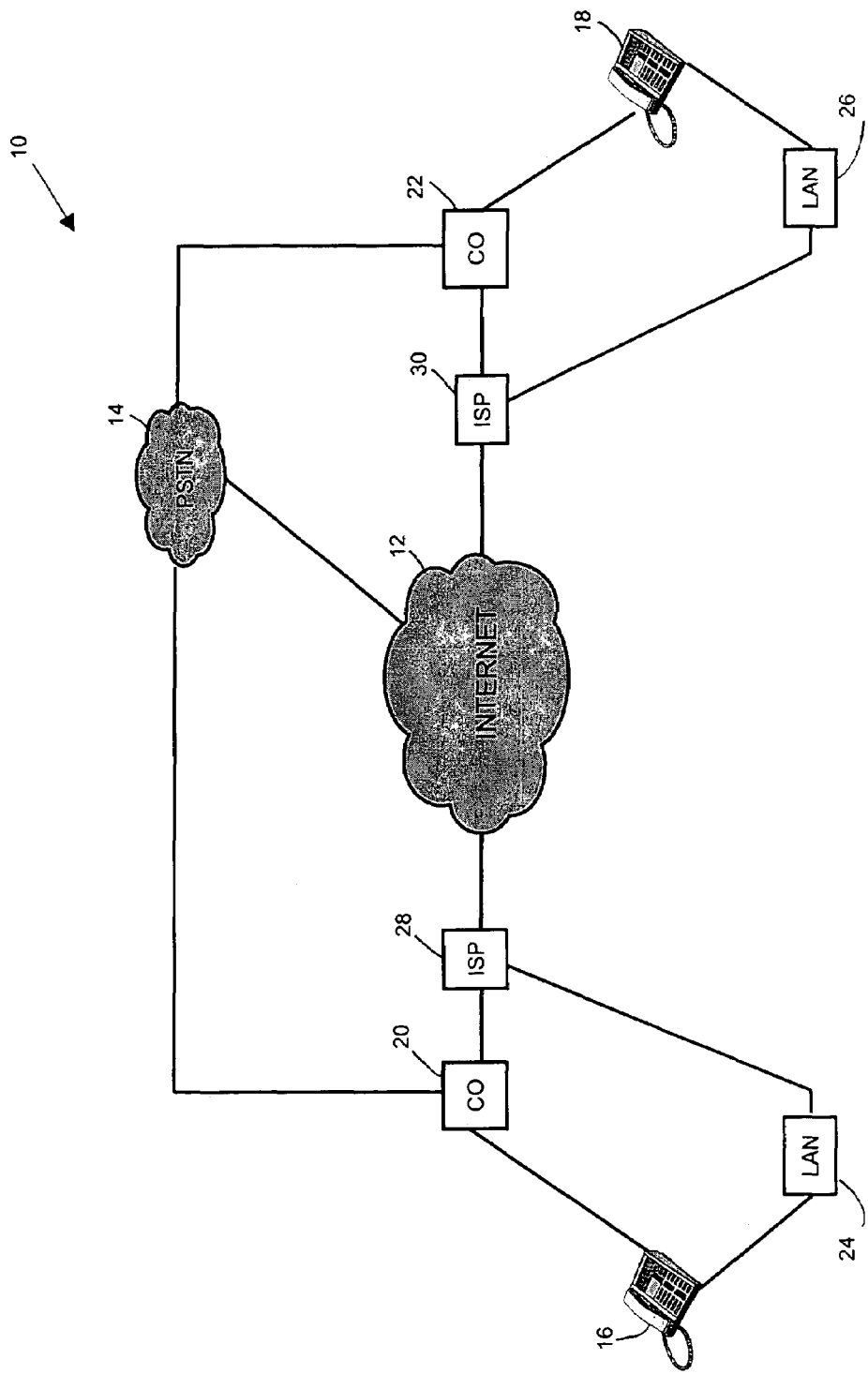
FIG. 2a illustrates an Internet telephone call system according to the present invention.

FIG. 2a illustrates a configuration of an Internet telephone call system 10. The Internet telephone call system 10 can transport voice over a packet-switched network 12, such as the Internet, using data packets or over a circuit-switched network 14, such as the public switched telephone network (PSTN). Accordingly, an Internet subscriber (hereinafter "subscriber" and not shown) having the necessary hardware and software may conduct real-time voice conversations over the Internet 12 or over the PSTN 14, rather than limited to using only the circuit switched network. The Internet telephones 16, 18 forming the call system 10 may include a conventional telephone and an adaptor having Internet telephony enabling hardware and software, e.g., the Komodo Fone™ product available from Komodo Technology, Inc. of Los Gatos, Calif. Alternative Internet telephones 16, 18 may integrate the telephone and the Internet telephony enabling hardware and software into a single system, as discussed in further detail below with respect to FIGS. 6–9.

As shown in FIG. 2a, the Internet telephone call system 10 includes at least two Internet telephones 16, 18, each connecting to a central office (CO) 20, 22 and/or a local area network (LAN) 24, 26. Further, each Internet telephone 16, 18 has an associated Internet Service Provider (ISP) 28, 30 in order to access the Internet 12. As such, the subscriber may select the manner of communication when making a telephone call.

For example, the subscriber may choose to make a traditional telephone call, wherein the Internet telephones 16, 18 are linked and the call routed via a PSTN 14 through the COs 20, 22. Alternatively, the subscriber may cause the Internet telephone 16, 18 to place the telephone call over the Internet 12 by accessing the ISP 28, 30 via the LAN 24, 26 or by using a dial-up modem to access the ISP, routing through the CO 20, 22.

With standard telephony, each conventional telephone unit has a unique and fixed telephone number by which other callers can signal that telephone unit. In contrast, on the Internet a connected user is assigned a unique but temporary Internet address (IP address)—assigned only for a specific dial-up session. Similar to a telephone number, the IP address identifies the destination point, or the point on the entire data network to which the data is being sent. Accordingly, a second user can locate that first user during a specific dial-up session by identifying the first user's IP address. However, after that dial-up session terminates, the IP address is re-assigned to another user for a different dial-up session. Since the IP address assigned to a connected subscriber changes for each dial-up session, it is necessary for the Internet telephones to quickly and efficiently identify the other's temporary IP address for each Internet call. The process of transmitting, registering, and identifying the Internet addresses of each Internet telephone is referred to as a "call negotiation scheme."

As discussed above, in order for the Internet telephones 16, 18 to communicate with one another over the Internet 12, a call negotiation scheme is required. Although either Internet telephone can initiate or receive an Internet telephone call, for illustrative purposes only, it will be assumed that the subscriber using the Internet telephone 16 will be the initiating caller, and the subscriber using the Internet telephone 18 will be the receiving party. Moreover, for illustrative purposes only, it will be assumed that the subscribers use dial-up modems to connect to the COs and then access the ISPs.

Figure 2B:
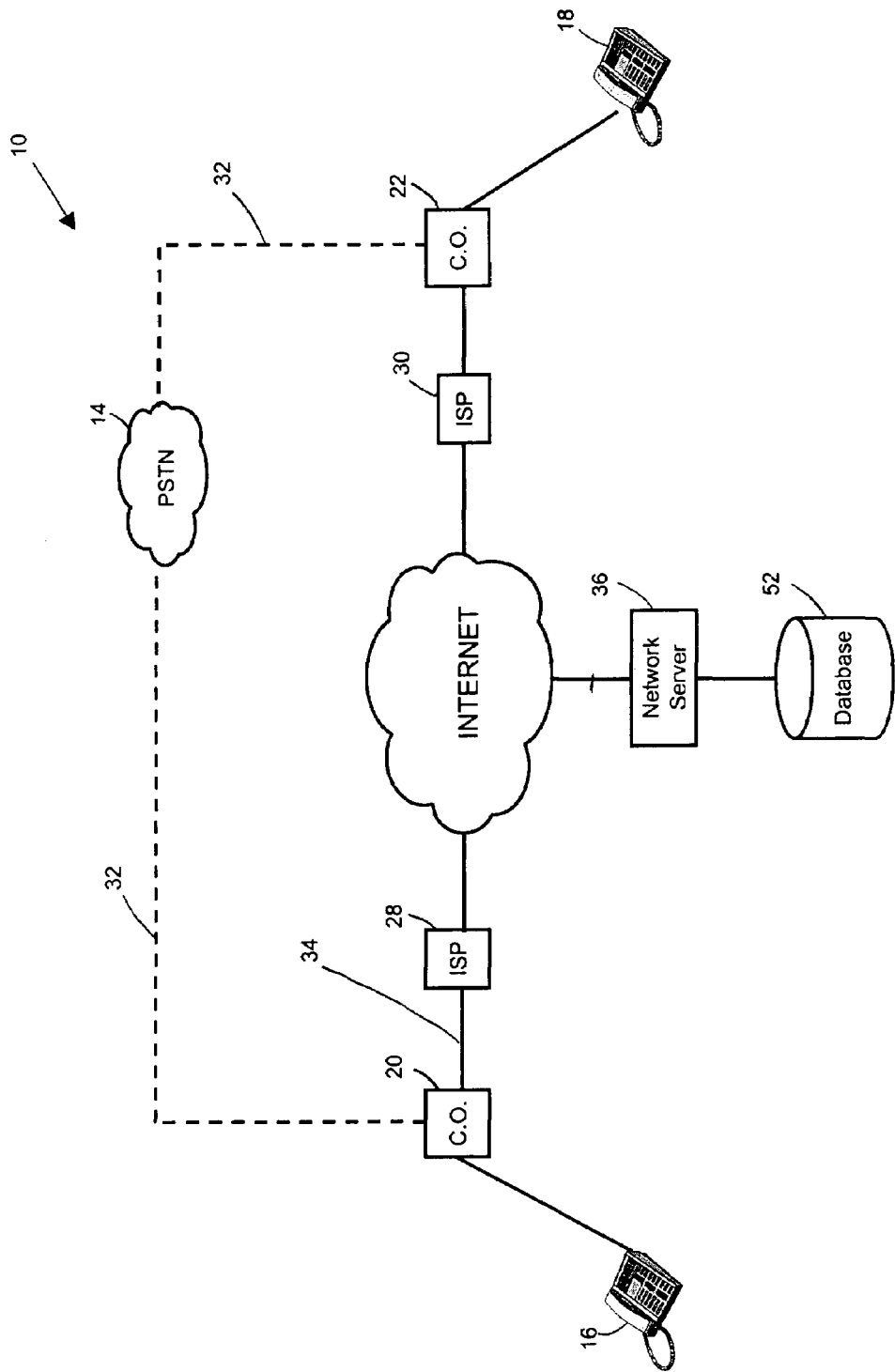
Figure 3:
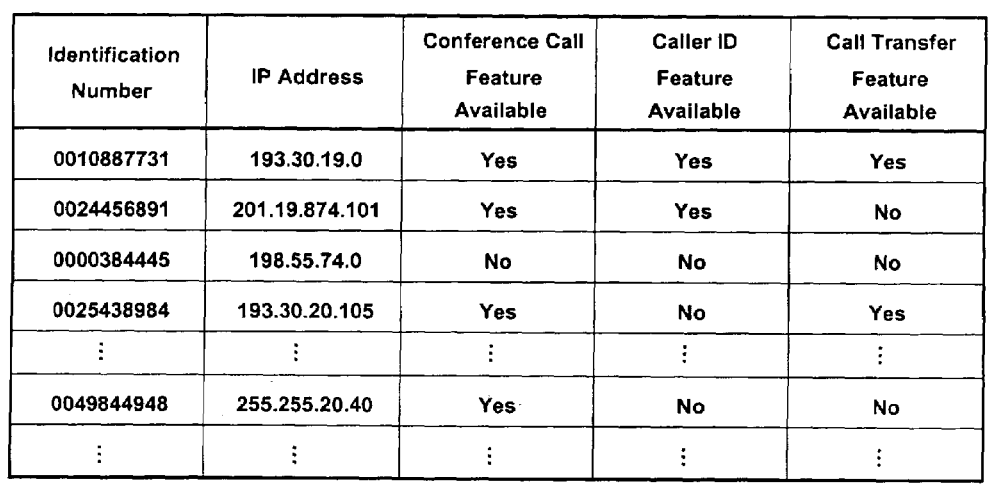
FIG. 3 illustrates stored data in a network server database.

With reference to FIG. 2b, in one call negotiation scheme, an Internet telephone 16 transmits an identification code to a second Internet telephone 18 over the PSTN 14 during a voice telephone call, as indicated by dashed lines 32. Then the voice telephone call terminates, and a connection is established between the Internet telephone 16 and its ISP 28, as indicated by the solid line 34. A dial-up modem is used to connect to the CO 20 and then to access the ISP. The ISP 28 assigns an IP address to the Internet telephone 16. Once assigned, the IP address assigned to the connected subscriber for that particular dial-up session and the identification code can be stored in a network server 36, for example, in tabular form as illustrated in FIG. 3.

Figure 4:
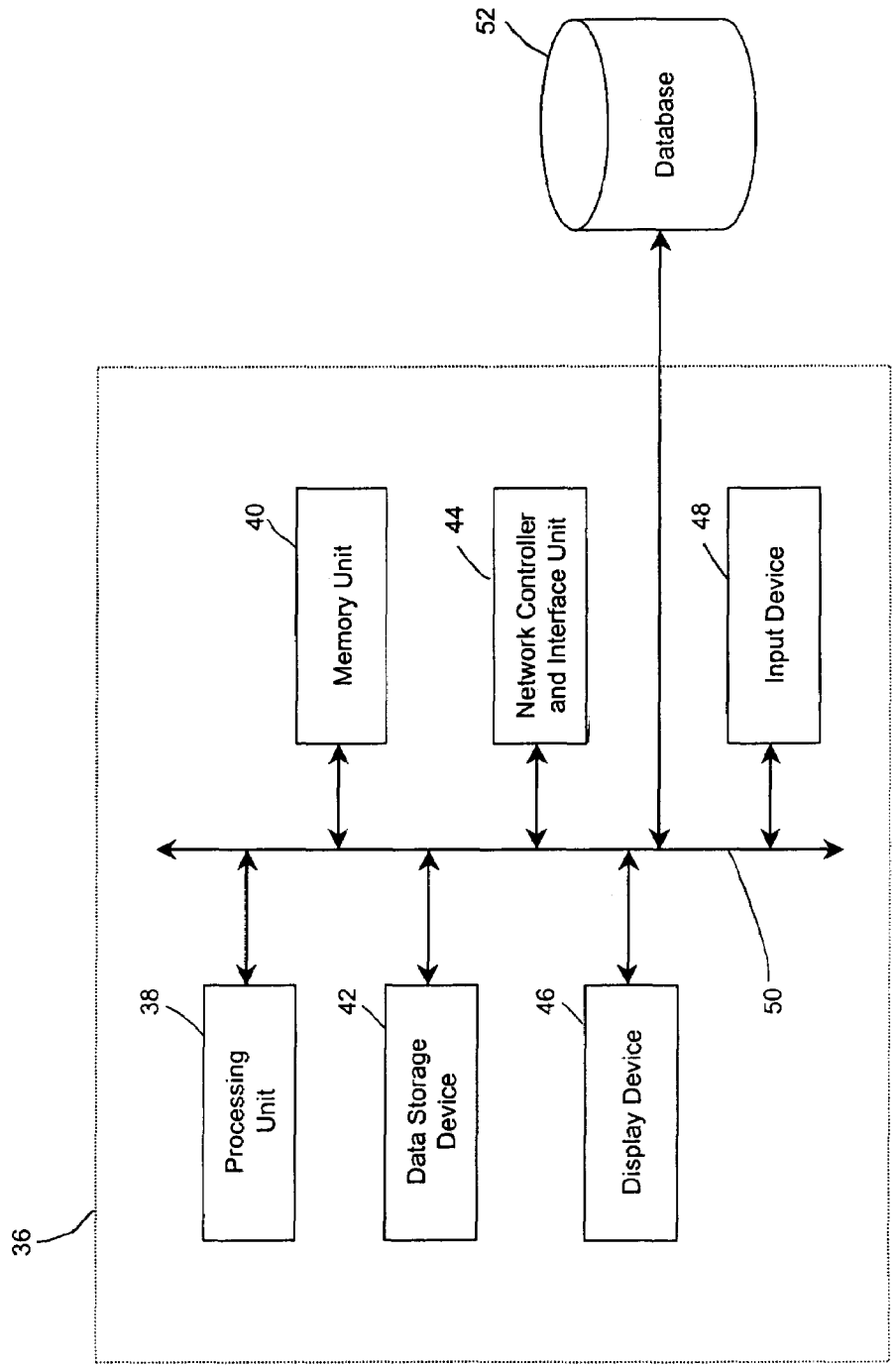
FIG. 4 is a block diagram of the hardware architecture of the network server.

More specifically and as illustrated in FIG. 4, the network server 36 includes a processing unit 38, a memory unit 40, a data storage device 42, a network controller and interface 44, a display device 46, and an input device 48. The processing unit 38, which may be, for example, a personal computer commercially available from Hewlett-Packard Co., communicates with the various elements via a system bus 50. The memory unit 40 contains a database 52 which identifies, among other things, the identification code of each connected Internet telephone 16, 18 and the temporary IP address assigned to the connected Internet telephones. The database 52 provides the means for mapping the identification code to the appropriate IP address, wherein the identification code uniquely identifies and is permanently assigned to that Internet telephone. The data storage device 42 is used for long-term storage of information.

A valid identification code is required to place or receive telephone calls over the Internet 12 using that Internet telephone. Further, the database 52 may also contain such information as the Internet call features available to a subscriber. Moreover, another database, which can link to the network server 36, maintains subscriber information based on the identification code, such as region of sale, date of sale, and other data.

Figure 5:
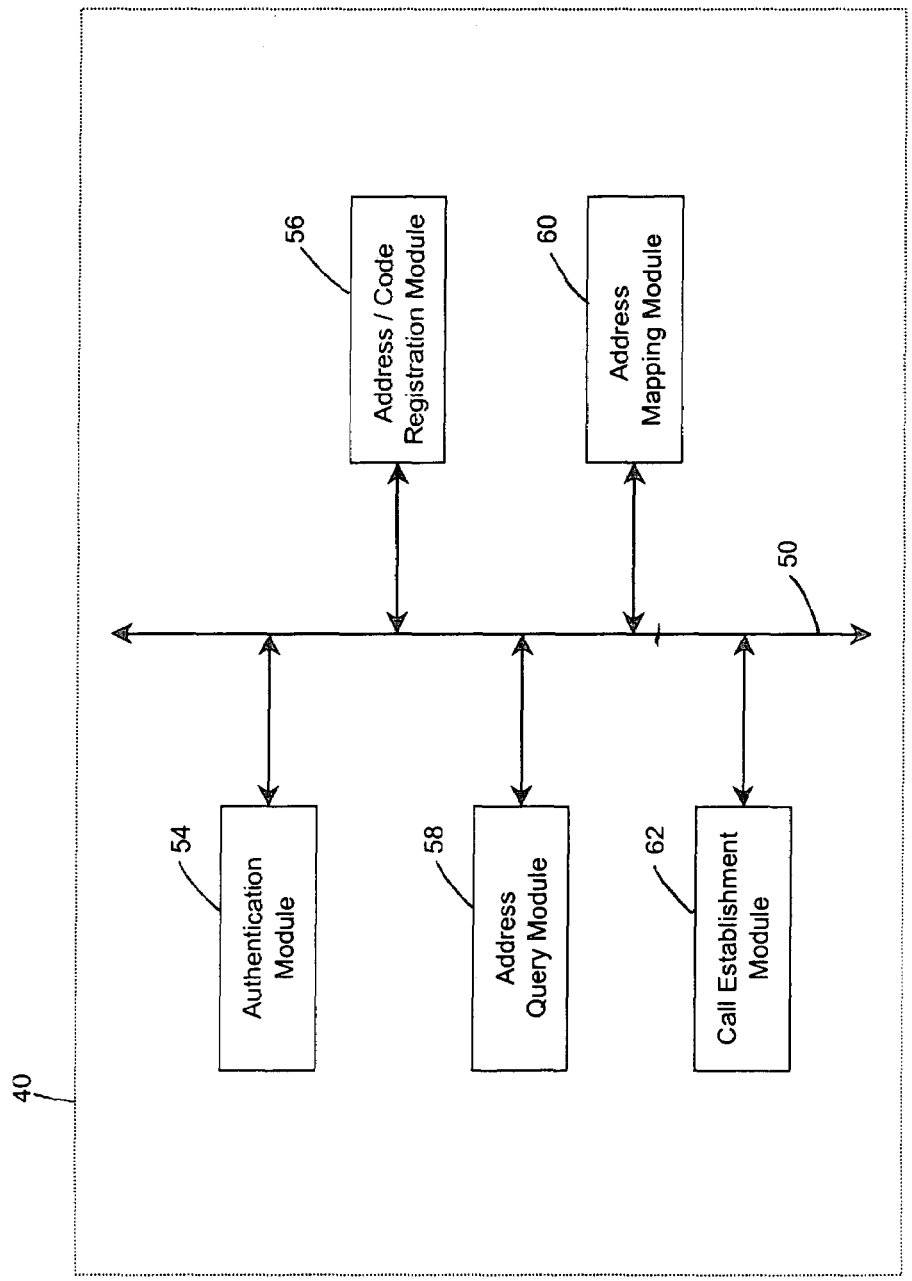
FIG. 5 is a block diagram of the memory unit of the network server of FIG. 4.

As shown in FIG. 5, the memory unit 40 includes an authorization module 54, an address/code registration module 56, an IP address query module 58, an address mapping module 60, and a channel establishment module 62. The network server 36 operates under the control of an operating system, such as the well-known UNIX operating system.

In operation, an IP address is assigned to the connected subscriber for a particular dial-up session by the ISP. The IP address is sent to the Internet telephone 16, whereupon the Internet telephone 16 sends the IP address and identification code to the authentication module 54 of the network server 36. The authentication module 54 verifies whether the identification code is valid. Upon proper validation, the address/code registration module 56 responds by registering the IP address in the database 52 of the memory unit 40. In one embodiment of the invention, the address/code registration module 56 receives a register command signal to register the IP address in the memory unit 40.

Thus, when a search of the database 52 is performed using the transmitted identification code, the IP address query module 58 receives a search command signal and causes the address mapping module 60 to identify the IP address assigned to a subscriber. Next the channel establishment module 62 establishes a communication channel between the first Internet telephone 16 and the second Internet telephone 18. Then by periodically signaling the network server 36 to indicate the connection status of the Internet telephones 16, 18 and by updating the IP addresses stored in the database 52 for each connected Internet telephone 16, 18, a dynamic and accurate picture of the Internet telephone environment is continuously maintained. As such, an Internet telephone querying the network server 36 can determine whether a voice communication link or channel can be established with a particular subscriber using Internet facilities.

Figure 2C:
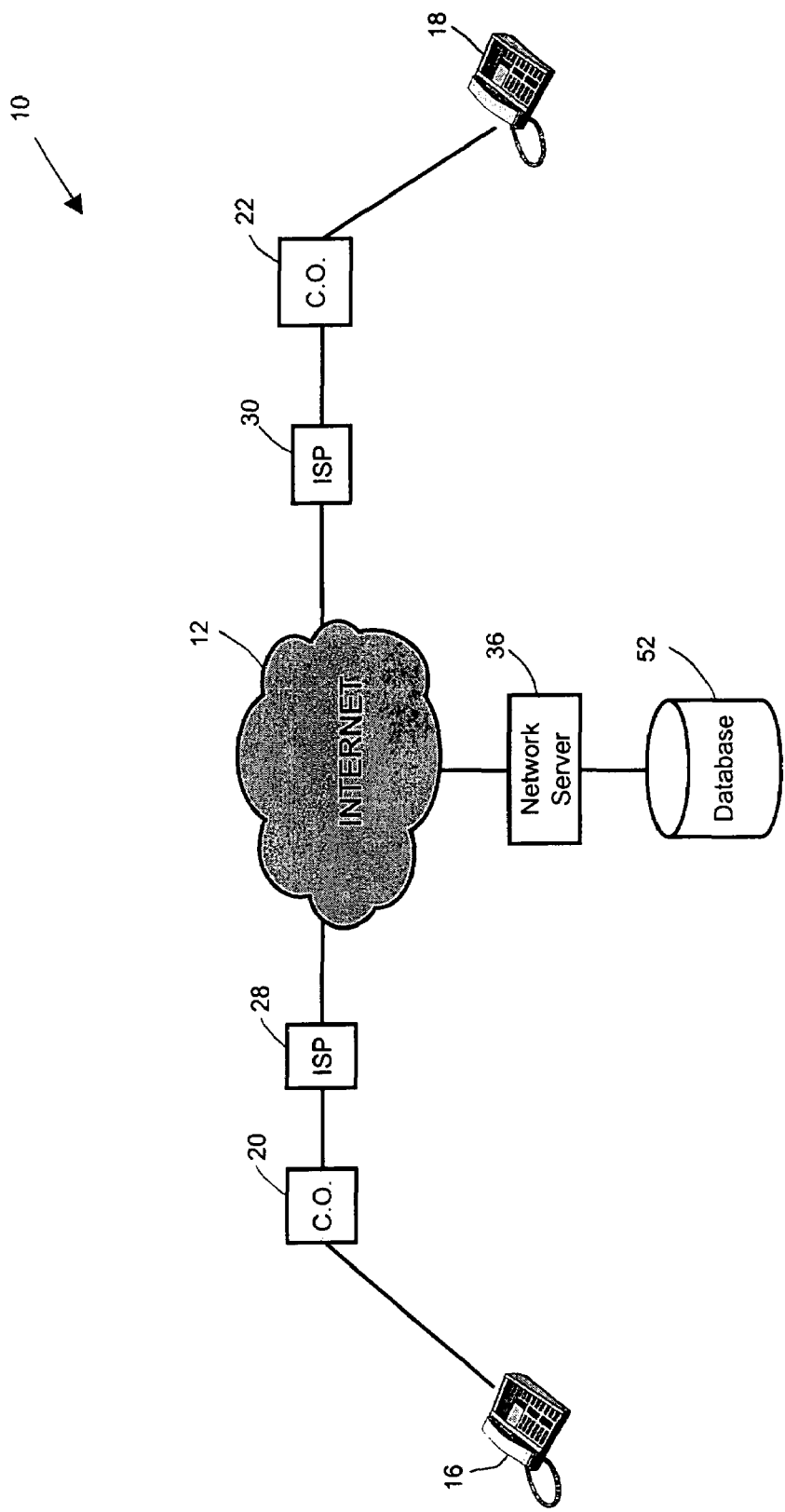

According to an alternative embodiment of the call negotiation scheme, illustrated in FIG. 2c, the first and second Internet telephones 16, 18 can establish a communication channel over the Internet 12 without previously establishing the voice telephone call. In doing so, the first subscriber can avoid incurring the telephone charges associated with placing that voice call over the circuit switched telephone network 14. Here, it is assumed that the subscriber of the second Internet telephone 18 has prior knowledge of the first Internet telephone's 16 identification code. Further, the subscribers of the first and second Internet telephones 16, 18 may have pre-arranged a time to establish the communication link. For example, in this alternative call negotiation scheme at the pre-arranged time, the first Internet telephone 16 establishes a connection with its associated ISP 28 via the central office 20, whereupon the ISP assigns an IP address to that first Internet telephone. The identification code and IP address of the first Internet telephone 16 are then stored in the network server 36. While remaining connected to the Internet 12, the first Internet telephone 16 waits for the second Internet telephone 18 to locate and then establish an Internet telephony channel with said first Internet telephone. When the second Internet telephone 18 establishes a connection with its associated ISP 30 by routing through central office 22, the second Internet telephone transmits a search command signal to the network server 36 to search for the first Internet telephone's IP address. By pre-arranging the call time, the subscriber of the first Internet telephone 16 can limit the amount of time spent waiting for the second Internet telephone 18 to locate and then establish this communication link.

Figure 2D:
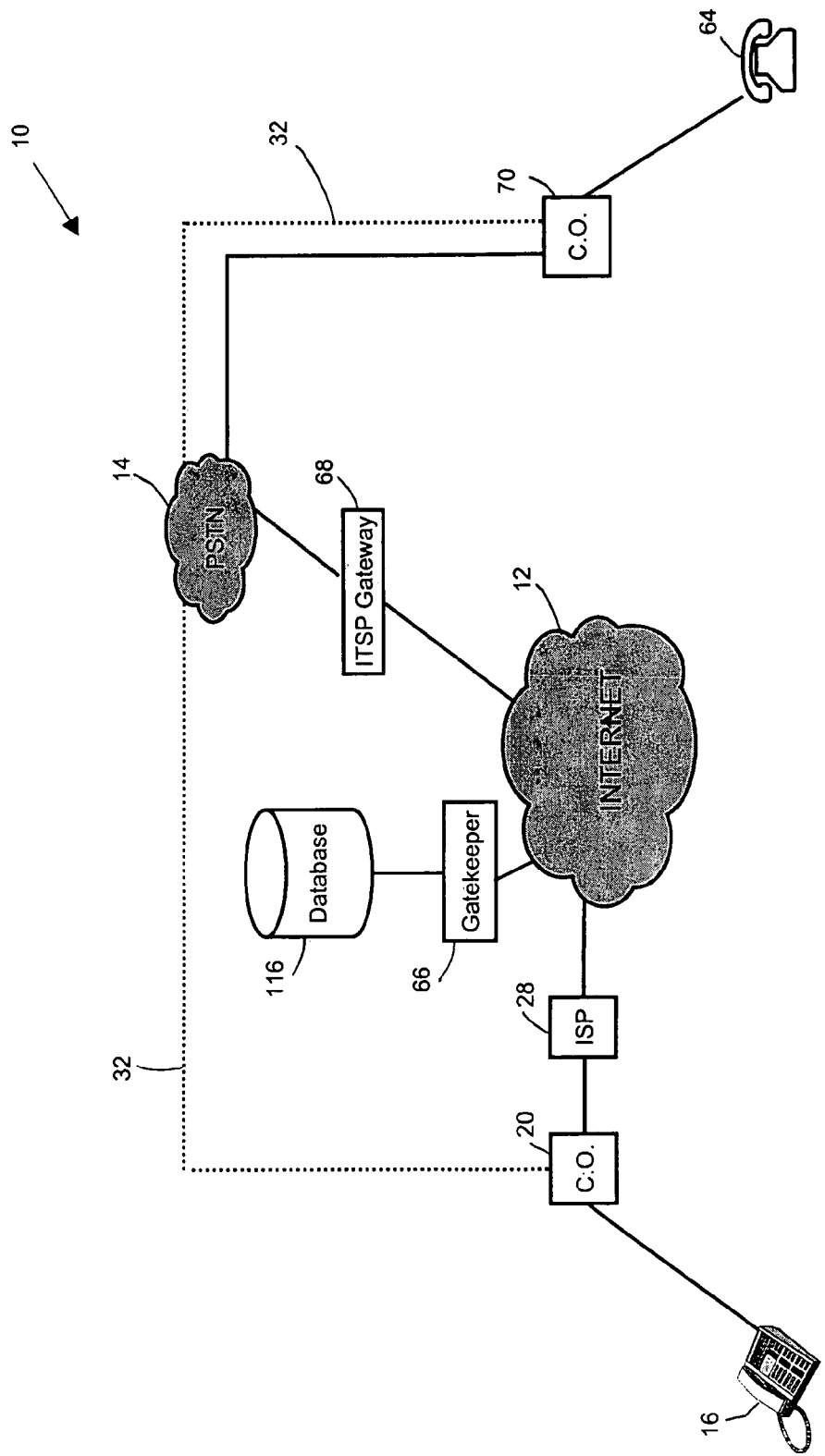

In an alternative manner of voice communication, illustrated in FIG. 2d, the subscriber may cause the Internet telephone 16 to place a call with a conventional telephone 64 which does not connect to the Internet 12. Here, the call may route via the PSTN 14, as indicated by dotted lines 32, or use the Internet 12, as indicated by solid lines. When using the Internet 12, the subscriber initiates the call using the Internet telephone 16, and the call routes through the CO 20 to the subscriber's ISP 28 which assigns an IP address to the Internet telephone 16. In response to receipt of the subscriber's incoming call, a gatekeeper 66 of an Internet Telephony Service Provider (ITSP) with which the subscriber is associated will determine the appropriate routing to an IP gateway (gateway) 68 serving the destination telephone 64. Accordingly, the call is routed over the Internet 12 to the appropriate IP gateway 68 which then connects the call via the PSTN 14 to the CO 70 serving the destination telephone 64. It will be understood that the call can also route through the gatekeeper 66 and the gateway 68 to the PSTN 14, thereafter routing to the CO 70 serving the destination telephone 64.

Figure 2E:
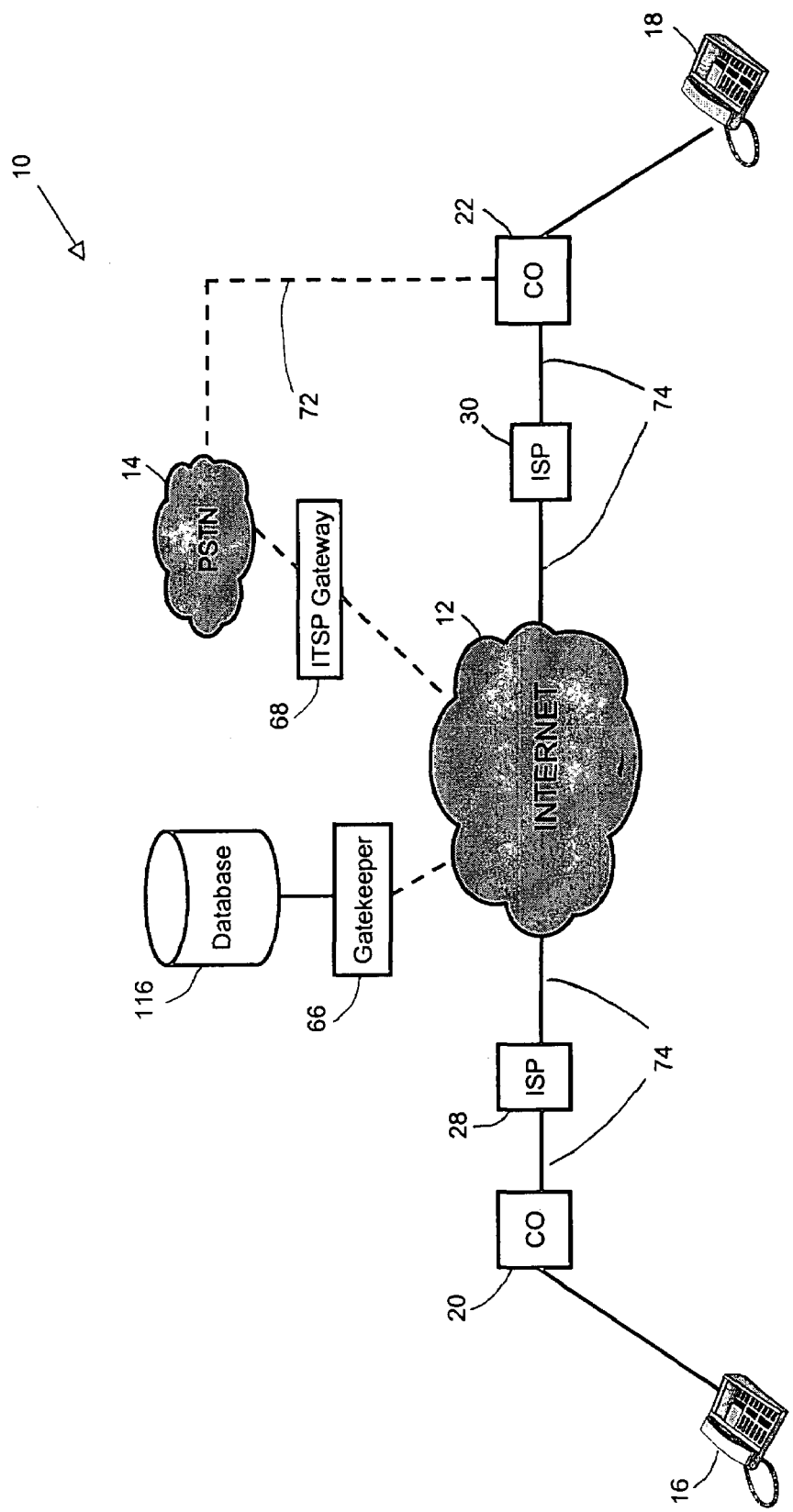

In yet a further alternative call negotiation scheme, with reference to FIG. 2e, a first Internet telephone 16 can establish a communication channel with a second Internet telephone 18 without having to perform a search of the database 52. In this call negotiation scheme, a connection is established between a first Internet telephone 16 and its associated ISP 28, whereupon the ISP assigns an IP address to that first Internet telephone. Then the first Internet telephone 16 establishes a communication channel with the second Internet telephone 18, the channel routing via the Internet 12 and PSTN 14 by way of the gateway 68, as described previously and indicated by dashed lines 72. Using this communication channel, the first Internet telephone 16 sends its IP address to the second Internet telephone 18. Next the second Internet telephone 18 transmits an acknowledgement signal back to the first Internet telephone 16 and stores the IP address into memory. Upon transmitting the acknowledgement signal, the communication link 72 between the second Internet telephone 18 and the Internet 12 disconnects. While remaining connected to the Internet 12, the first Internet telephone 16 waits for the second Internet telephone 18 to locate and then establish an Internet telephony channel with said first Internet telephone, indicated by solid lines 74, using the IP address stored in the second Internet telephone's memory.

Figure 6:
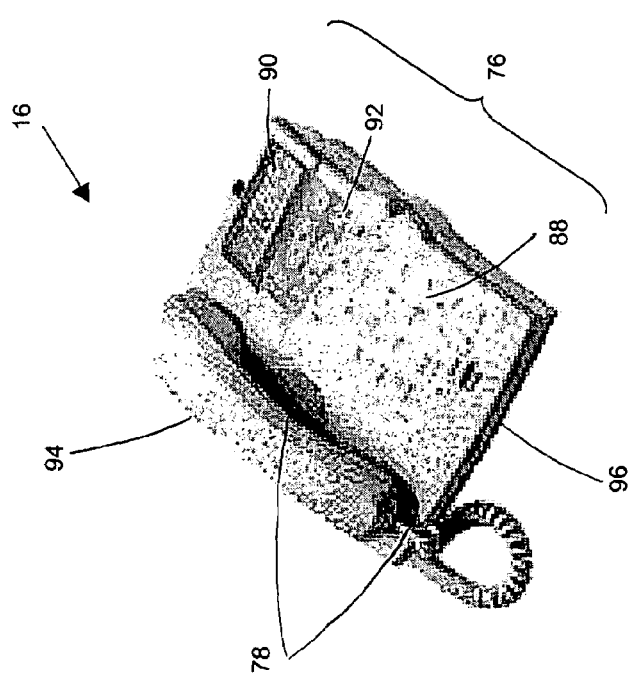
FIG. 6 is a perspective view of one embodiment of an Internet telephone.
Figure 7:
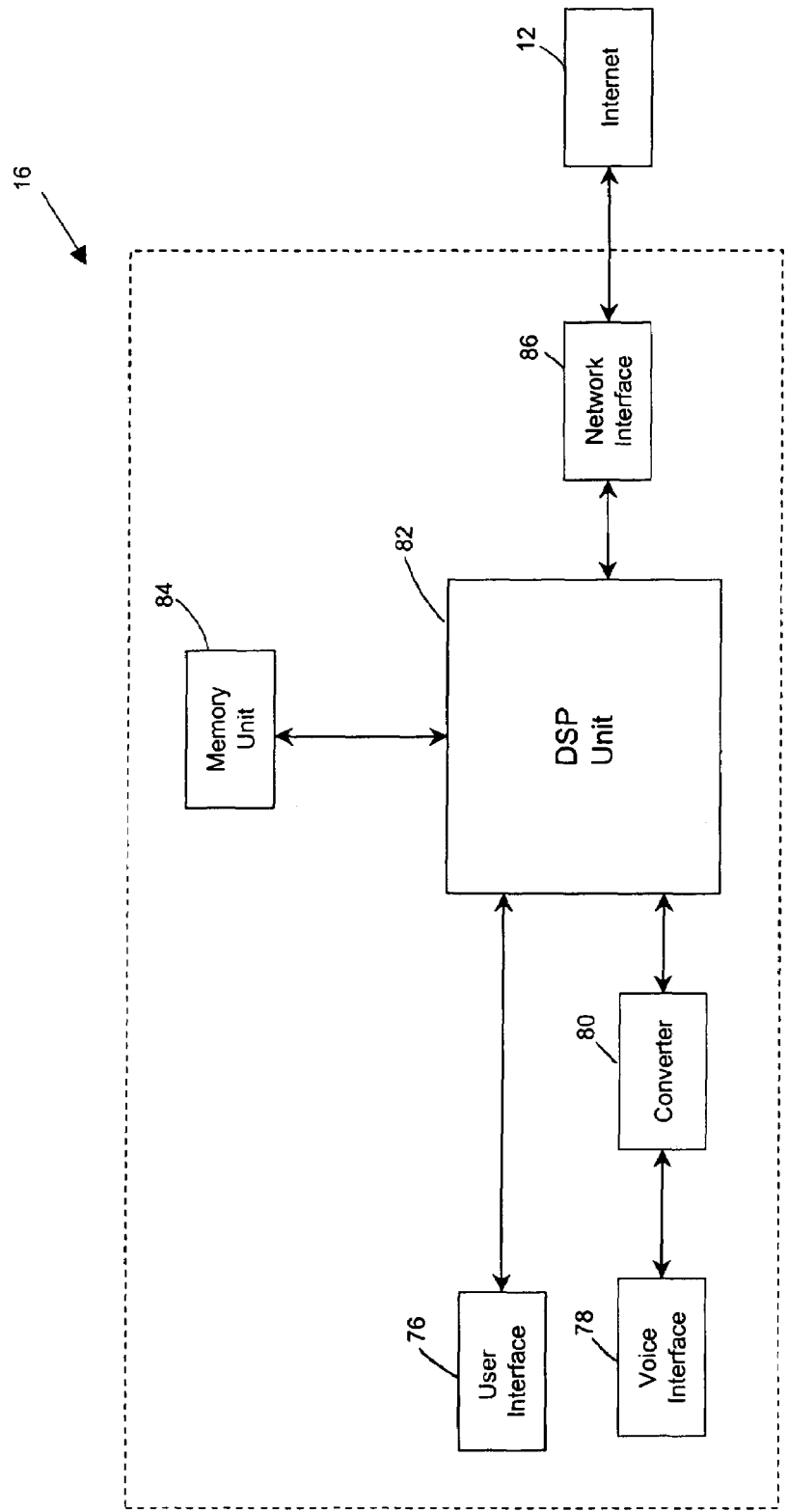
FIG. 7 is a block diagram of the hardware architecture of the Internet telephone.

FIG. 6 shows one embodiment of the Internet telephone 16, and FIG. 7 depicts the basic components of said Internet telephone. As illustrated in FIGS. 6 and 7, the Internet telephone 16 is preferably a stand-alone device which includes a user interface 76, a voice interface 78, a converter 80, a digital signal processor unit 82 and associated logic, a memory unit 84, and a network interface 86. The Internet telephone 16 can perform voice over Internet functions, such as scanning, voice compression, data packetization, and network interfacing.

The user interface 76 allows a user to interact with the Internet telephone 16. The user interface 76 includes, among other features, a keypad 88 for dialing numbers or activating certain call functions and an audible indicator for indicating operating characteristics and/or instructions, such as new telephone messages, the call status, or selectable options from a telephonic voice menu, including available call features. The user interface 76 may also include a visual display 90 for displaying such operating characteristics. In one embodiment, the Internet telephone 16 has a single means for activating a call function. For example, by depressing a programmable button 92 or moving a switch, the Internet telephone 16 can perform a call negotiation scheme, as discussed above, or perform a diagnostic test to verify Internet connectivity, or perform a diagnostic test to troubleshoot voice quality-of-service problems, or activate the telephonic voice menu. Although the Internet telephone 16 is shown as having single button activation 92 of call functions, it will be understood that the Internet telephone may also use voice or video activation. Similarly, the language spoken in voice menu can be translated to another desired language by using a single activation means.

The voice interface 78, in accordance with conventional practice, is a speaker or microphone located on the telephone handset 94 and/or base 96. Speech signals from the microphone 78 are transmitted to a converter 80 that provides the conversion of analog voice into digital signals. Specifically, the analog voice is digitized, by means commonly known in the field, and the digital data are transmitted to a digital signal processor unit (DSP unit) 82 which provides call processing and voice processing.

The DSP unit 82 and associated logic are supported by voice processing software and a memory unit 84, described in greater detail below. The DSP unit 82 includes a digital signal processor and other control processing units. The DSP unit 82 performs call signaling and control, voice compression and decompression, and packetization and depacketization functions.

The memory unit 84 includes programmable and dynamic memory, such as electrically erasable programmable read-only memory (EEPROM) and dynamic random access memory (DRAM) devices. The memory unit 84 stores the call negotiation algorithms (described in greater detail below) which the DSP 82 follows, as well as provides temporary storage of incoming data not yet processed by the DSP. In addition, the identification code, as described above, is stored in the memory unit 84.

Figure 8:
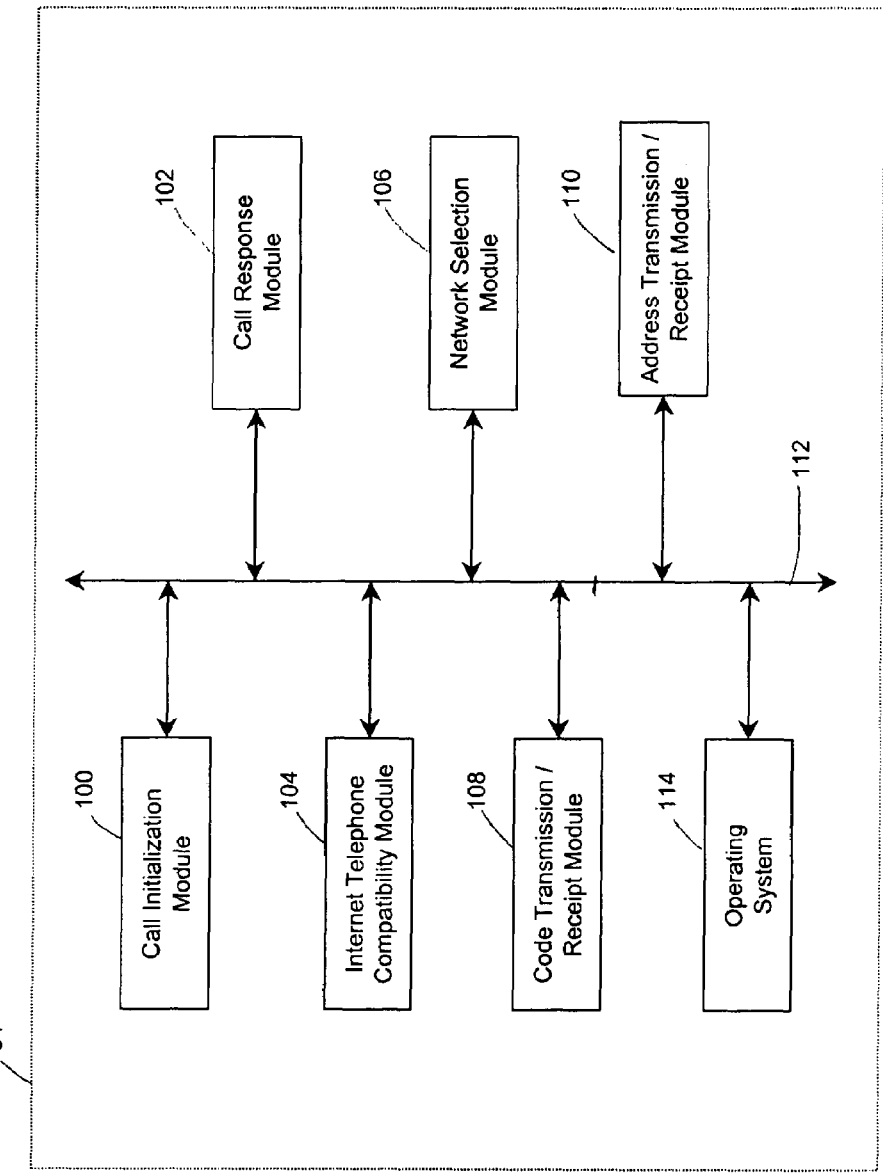
FIG. 8 is a block diagram of the memory unit of the Internet telephone of FIG. 7.

As illustrated in FIG. 8, the memory unit 84 includes a call initialization module 100, a call response module 102, an Internet telephone compatibility module 104, a network selection module 106, a code transmission/receipt module 108, and an IP address transmission/receipt module 110. The memory unit 84 communicates with the various elements via a system bus 112. Each element will be described in greater detail below. Moreover, the memory unit 84 operates under the control of an operating system 114 which allows the memory unit to perform multiple tasks, simultaneously.

Figure 9:
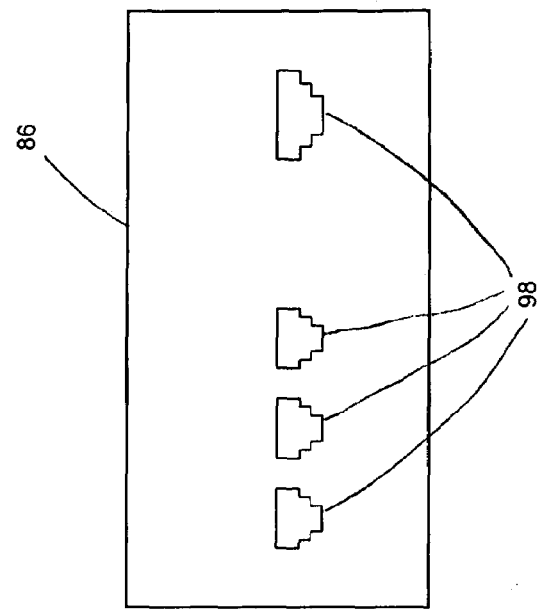
FIG. 9 is an enlarged rear view of a portion of the Internet telephone of FIG. 6.

The network interface 86 allows transmission and reception of voice packets to and from the Internet telephone 16. For example, the Internet telephone 16 has telephone and/or LAN connectivity. Although the Internet telephone 16 is shown in FIG. 9 as including four means for network connection 98, one of which allows for connection to the PSTN 14, it will be understood that the Internet telephone may include more than four network connectors or as few as two network connectors. The means for network connection 98 may include, but is not limited to, RJ11 ports, RJ45 ports, RS-232 ports, and USB.

Additionally, while the Internet telephone 16 in FIGS. 6 and 7 combine the user and voice interfaces 76, 78, the converter 80, the DSP unit 82 and associated logic, the memory unit 84, and the network interface 86 into a single device, one skilled in the art will appreciate that such components can be combined or separated on distinct devices without significantly affecting the functionality of the Internet telephone.

Figure 10:
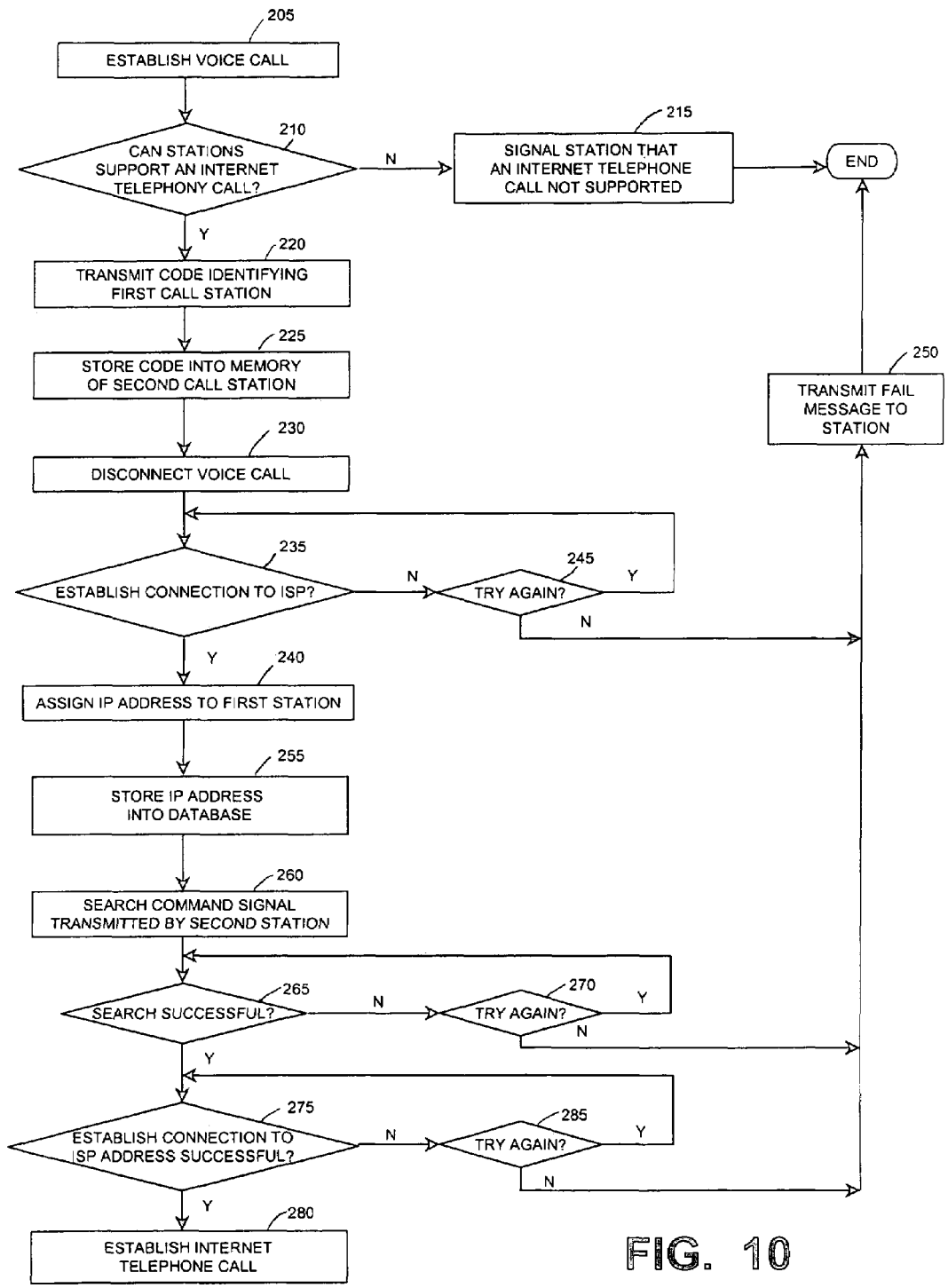
FIG. 10 is a flowchart showing a first embodiment of a method of negotiating a telephone call over a data network in accordance with FIG. 2b.

FIG. 10 shows the steps of an exemplary embodiment of a call negotiation scheme to establish a voice communication channel over the Internet 12 between a first Internet telephone 16 and a second Internet telephone 18, as it relates to FIG. 2b.

The block 205 indicates that a communication channel is established between the first and second Internet telephones 16, 18, wherein the communication channel typically uses a circuit-switched telephone network 14. Specifically, the call initialization module 100 of the first Internet telephone 16 places a call to the second Internet telephone 18 via the PSTN 14. The call response module 102 can then determine whether a connection has been established between the parties. This step also serves as confirmation to the first subscriber that the second subscriber is available to establish voice communication over the Internet 12.

At decision block 210, it is determined whether the Internet telephones 16, 18 can support an Internet telephone call. In one embodiment of the invention, the Internet telephone compatibility module 104 will make this determination if it detects the other station's capability to do so. For example, the Internet telephone compatibility module 104 can detect the other station's capability to support Internet telephony by signaling the destination station (using a signal generator) and then receiving an appropriate response signal, or acknowledgement (using a signal detector). It will be understood that the determination of whether the stations can support Internet telephony can be performed through dual tone multi-frequency (DTMF) signaling.

If the answer to decision block 210 is no, then the process moves to block 215 wherein the subscriber is made aware that the communication channel must route over a circuit switched telephone network 14 since the other station cannot support Internet telephone calls. Otherwise, the process moves to block 220 where the code transmission/receipt module 108 of the first Internet telephone 16 transmits a code, such as its identification code, which uniquely identifies that first station. For example, the subscriber may depress the programmable button 92 to trigger the code transmission/receipt module 108 to transmit the code.

Next at block 225, the second Internet telephone 18 receives the code and stores it into the memory unit 40. Having stored the code, the process proceeds to block 230. Here, the Internet telephones 16, 18 disconnect the communication channel (i.e., disconnect the voice link connecting the Internet telephones to the PSTN) and attempt to connect to their respective ISP 28, 30, for example, using the call initialization modules 100.

At decision block 235, it is determined whether or not the Internet telephones 16, 18 have successfully connected to their respective ISP 28, 30. If so, the process proceeds to block 240 where the Internet telephones 16, 18 are assigned IP addresses by their ISPs 28, 30. The assigned IP addresses are then stored in the memory unit 40. Otherwise, the process moves to decision block 245, wherein it is decided whether or not to re-attempt connecting to the ISP since, due to incorrect "userid" or password or other reasons, the ISP was unavailable. The non-connected Internet telephone(s) will make a predetermined number of attempts to connect to the ISP, the process looping back to decision block 235 for each attempt. If a connection is not successfully established after making the predetermined number of attempts, the Internet telephone indicates the failure to the subscriber (block 250).

Having failed to successfully establish connections to the ISPs 28, 30, the Internet telephones 16, 18 can be programmed to then automatically establish a voice telephone call based on predetermined criteria. For example, a subscriber may have programmed a prioritized list of telephony service providers, such as AT&T, MCI, or 10-10-xxx dial-around services, into the memory unit 40 based upon quality-of-service and/or cost preferences. Accordingly, based on the prioritized list, the network selection module 106 of the first Internet telephone 16 will automatically select the telephone carrier listed as "highest priority" and establish a voice call over that carrier's facilities. But if such carrier facilities are unavailable, the Internet telephone 16 will select the next listed telephone carrier to establish the voice call.

At block 255, the IP address assigned to the connected Internet telephone 16 by the ISP 28, as well as the corresponding code, are sent by the IP address transmission/receipt module 110 to the authentication module 54 of the network server 36. Upon proper validation of the code, the address/code registration module 56 responds by registering the IP address and code in the database 52 maintained by the network server 36.

Next at block 260, a search request signal from the second Internet telephone 18 is received by the network server 36. The network server 36 responds to the search request signal by transmitting a search command to the address mapping module 60, wherein the database 52 is searched for the code transmitted by the first Internet telephone 16 at block 220. By searching the database 52 using the first Internet telephone's code, the IP address can be identified so that the second Internet telephone 18 can transmit call setup signals to establish an Internet telephony link. In an alternative embodiment, the IP addresses assigned to both connected Internet telephones 16, 18, as well as their corresponding codes, are sent to the authentication module 54, wherein the mapping function can be performed for both Internet telephones.

At decision block 265, it is determined whether or not the search is successful. If the answer to this determination is no, then the process moves to decision block 270 where it is decided whether or not to re-attempt searching the database 52. A predetermined number of search attempts will be made on the database 52, the process looping back each time to decision block 265. If a search is not successful after making the predetermined number of attempts, the Internet telephone 18 indicates the failure to the subscriber (block 250).

If the answer to the determination at decision block 265 is yes, the process proceeds to decision block 275. Here, the second Internet telephone 18 has transmitted call setup signals to establish an Internet telephony link. However, it must be determined whether the channel establishment module 62 has successfully established such link. If so, the process moves to block 280 where the first and second Internet telephones 16, 18 can conduct real-time voice conversations over the Internet 12. Otherwise, the process moves to decision block 285 where it is decided whether or not to re-attempt establishing the Internet telephony link. A successful link will be attempted a predetermined number of times, the process looping back at each attempt to decision block 275. If such link is not established after the predetermined number of attempts, the Internet telephones 16, 18 indicate the failure to the subscribers (block 250). In one embodiment, having failed to successfully establish the Internet telephony link, the Internet telephones 16, 18 can be programmed to automatically select a telephony service provider based on a prioritized list. The network selection module 106 of the first Internet telephone 16 will then place a call using the telephone carrier listed as "highest priority."

Figure 11:
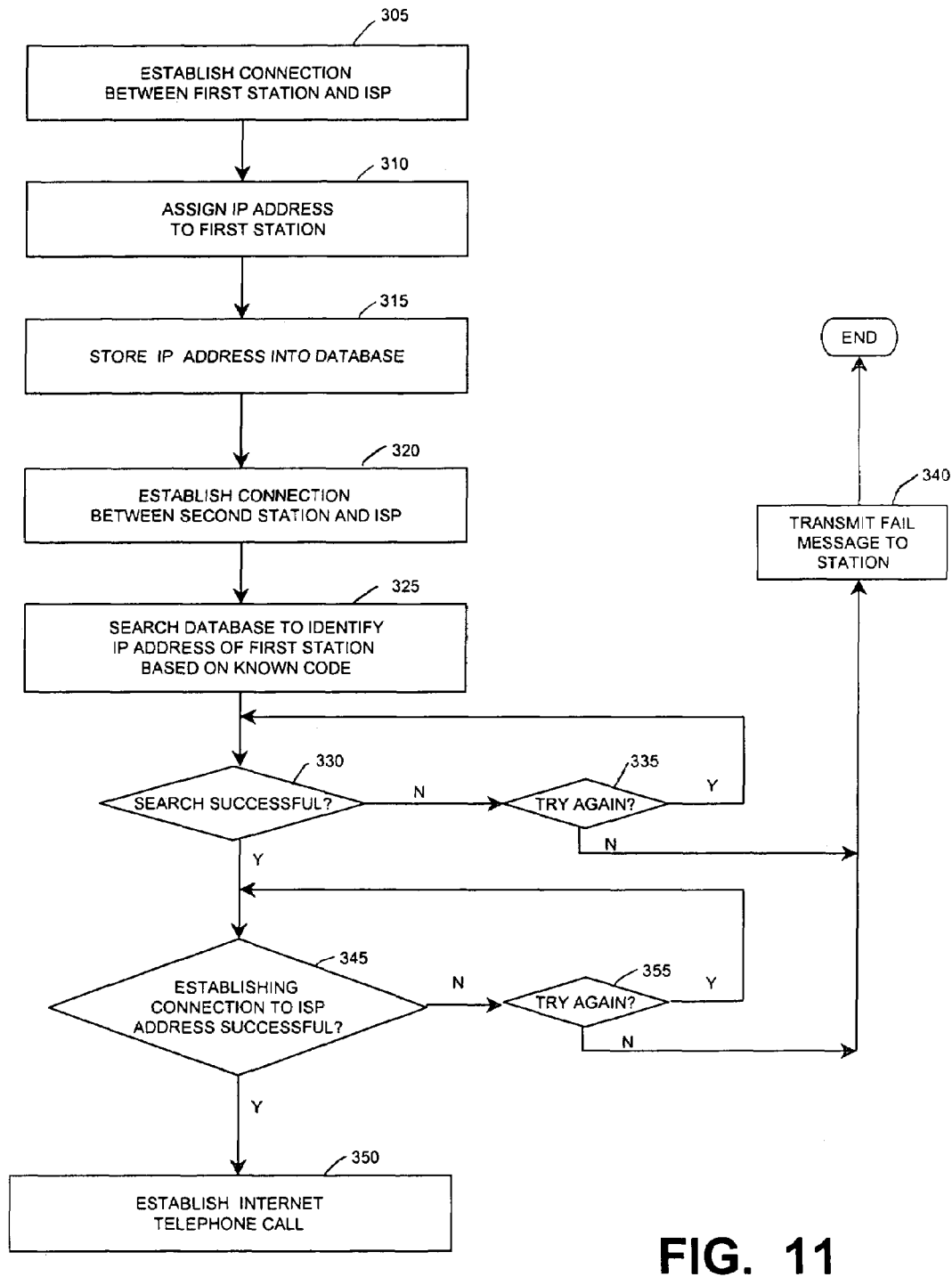
FIG. 11 is a flowchart showing a second and alternative embodiment of the method of negotiating a telephone call over a data network in accordance with FIG. 2c.

With reference to FIGS. 2c and 11, in an alternative embodiment of the call negotiation scheme, the first and second Internet telephones 16, 18 can establish a voice communication channel over the Internet 12 without first establishing the voice call of block 205. In doing so, the first subscriber can avoid incurring the telephone charges associated with placing that voice call over the circuit switched telephone network 14.

The block 305 indicates that the first Internet telephone 16 establishes a communication channel with its associated ISP 28. Specifically, the call initialization module 100 of the first Internet telephone 16 accesses the ISP 28 by using a dial-up modem. The call response module 102 can then determine whether a connection has been established between the first Internet telephone 16 and ISP 28. After connecting to the ISP 28, the first Internet telephone 16 will place subsequently received telephone calls "on hold" so as not to interfere with the call negotiation process.

At block 310, the Internet telephone 16 is assigned an IP address. Next the process flows to block 315 where the code and IP address transmission/receipt modules 108, 110 send the IP address and the code for the Internet telephone 16 to the authentication module 54 of the network sever 36. Upon proper validation of the code, the address/code registration module 56 responds by registering the IP address and code in the database 52. The database 52 provides the mapping of the code to the corresponding IP address. The first Internet telephone 16 remains connected to the ISP 28 while waiting for the second Internet telephone 18 to establish an Internet telephony link. As discussed above, by pre-arranging the call time, the subscriber of the first Internet telephone 16 can minimize the time spent waiting for the second Internet telephone 18 to locate and then establish this communication link.

Next at block 320, the second Internet telephone 18 connects to its associated ISP 30. Here it is assumed that the subscriber of the second Internet telephone 18 has prior knowledge of the code for the first Internet telephone 16. Thus, the subscriber can dial the code via the user interface 52, causing the second Internet telephone 18 to transmit a search request signal to the network server 36. Responsive to receipt of the subscriber's transmission of the search request signal, the network server 36 transmits a search command to the address mapping module 60, wherein the database 52 is searched for the first Internet telephone code (block 325).

At decision block 330, it is determined whether the database search was successful. By successfully searching the database 52 using the code, the IP address of the first Internet telephone 16 can be identified. However, if the search was not successful, the process moves to decision block 335. Here it is decided whether or not to re-attempt searching the database 38. The search will be performed a predetermined number of times when prior search attempts were unsuccessful, the process looping back at each attempt to decision block 330. If such search is unsuccessful after making the predetermined number of attempts, the second Internet telephone 18 indicates the failure to the subscriber (block 3140).

If the answer to the determination at decision block 330 is yes, the process flows to decision block 345, wherein the second Internet telephone 18 has transmitted a call setup signal to establish the Internet telephony link. However, it must be determined whether the channel establishment module 62 has successfully established such Internet telephony link. If so, the process moves to block 350 wherein the first and second Internet telephones 16, 18 are connected through the ISPs 28, 30, and the first and second subscribers can conduct real-time voice conversations over the Internet 12. Otherwise, the process moves to decision block 355 where it is decided whether or not to re-attempt establishing the Internet telephony channel.

A successful Internet telephony link will be attempted a predetermined number of times, the process looping back at each attempt to decision block 345. If such link is not established after the predetermined number of attempts, the Internet telephones 16, 18 indicate the failure to the subscribers (block 340). Substantially similar to the call negotiation scheme of FIG. 10, the Internet telephones 16, 18 can be programmed to then automatically select a telephony service provider based on a prioritized list and establish a voice telephone call.

Figure 12:
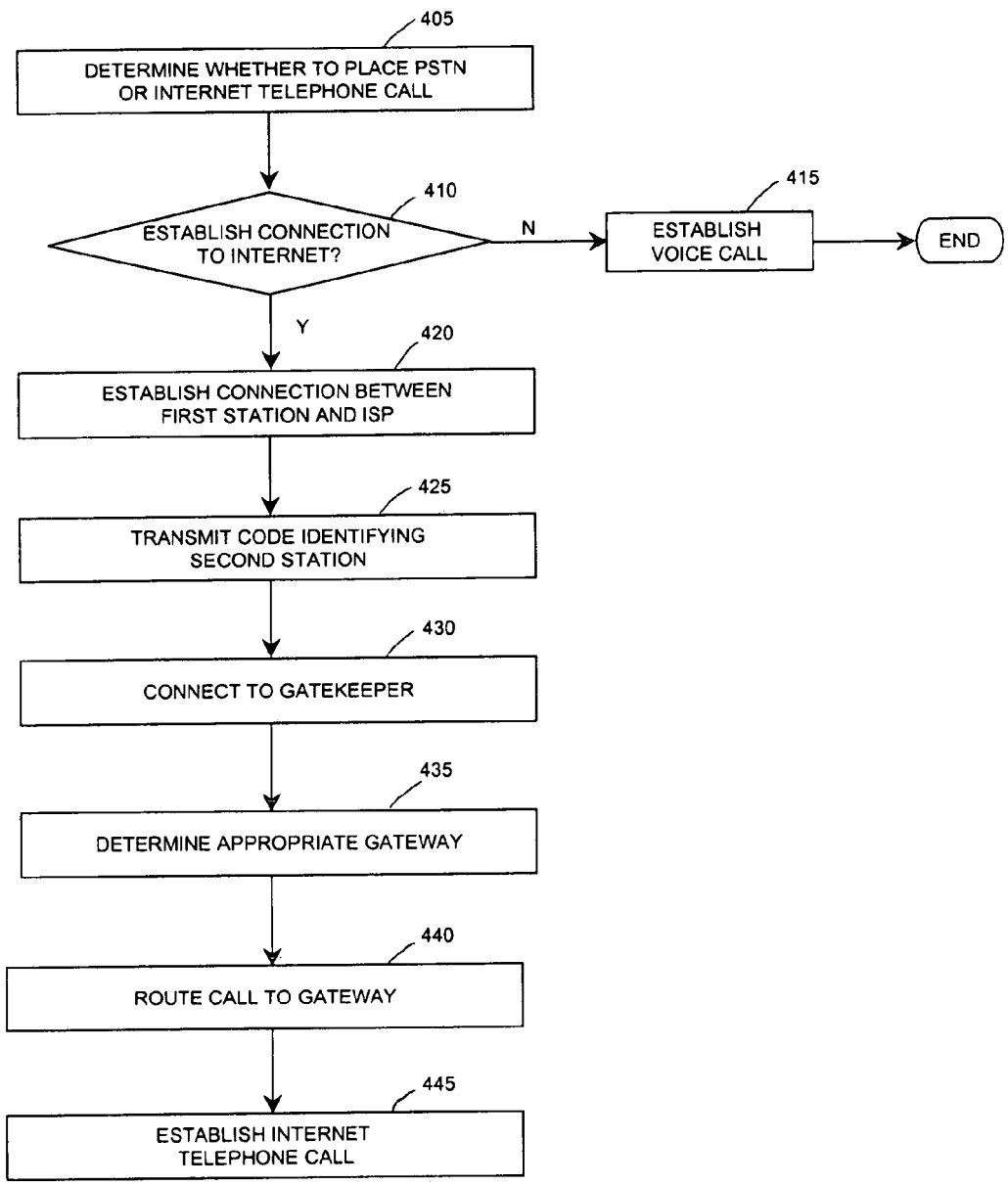
FIG. 12 is a flowchart showing a third and alternative embodiment of the method of negotiating a telephone call over a data network in accordance with FIG. 2d.

With reference to FIGS. 2d and 12, in another embodiment of the call negotiation scheme, the Internet telephone 16 can establish a voice communication channel with a conventional telephone 64 that does not connect to the Internet 12. In doing so, the packet switched network of the Internet 12 can integrate with the circuit switched telephone network 14. Such an integration of networks can allow a subscriber to communicate with another telephony user located anywhere else in the world without having to pay the long distance charges associated with making a telephone call using the PSTN 14.

The block 405 indicates that a subscriber will decide whether to establish a communication channel between the Internet telephone 16 and the destination telephone 64 over the Internet 12 or using the PSTN 14. If the subscriber decides to use the PSTN 14, then at block 415, the Internet and conventional telephones 16, 64 are linked and the call routed via the PSTN through the COs 20, 70, as indicated by dotted lines 32. Otherwise, the process moves to block 420, wherein a communication channel is established between the Internet telephone 16 and its associated ISP 28, as indicated by solid lines.

Next at block 425, the code transmit/receipt module 108 of the Internet telephone 16 transmits a code, such as the telephone number, which uniquely identifies the destination telephone 64. At block 430, the Internet telephone 16 connects with the gatekeeper 66, wherein the gatekeeper stores the destination telephone number into its database 116. Based on the code, at block 435 the gatekeeper 66 will determine the appropriate routing to the gateway 68 serving the destination telephone 36. Accordingly, a communication path is established between the Internet telephone 16 and the destination telephone 64 whereby the communication path routes over the Internet 12 to the appropriate gateway 68 (block 440). Then the communication path connects via the PSTN 14 to the CO 70 serving said destination telephone. By using this communication path, the Internet telephone 16 and the destination telephone 70 can conduct real-time voice conversations over the Internet 12 (block 445).

Figure 13:
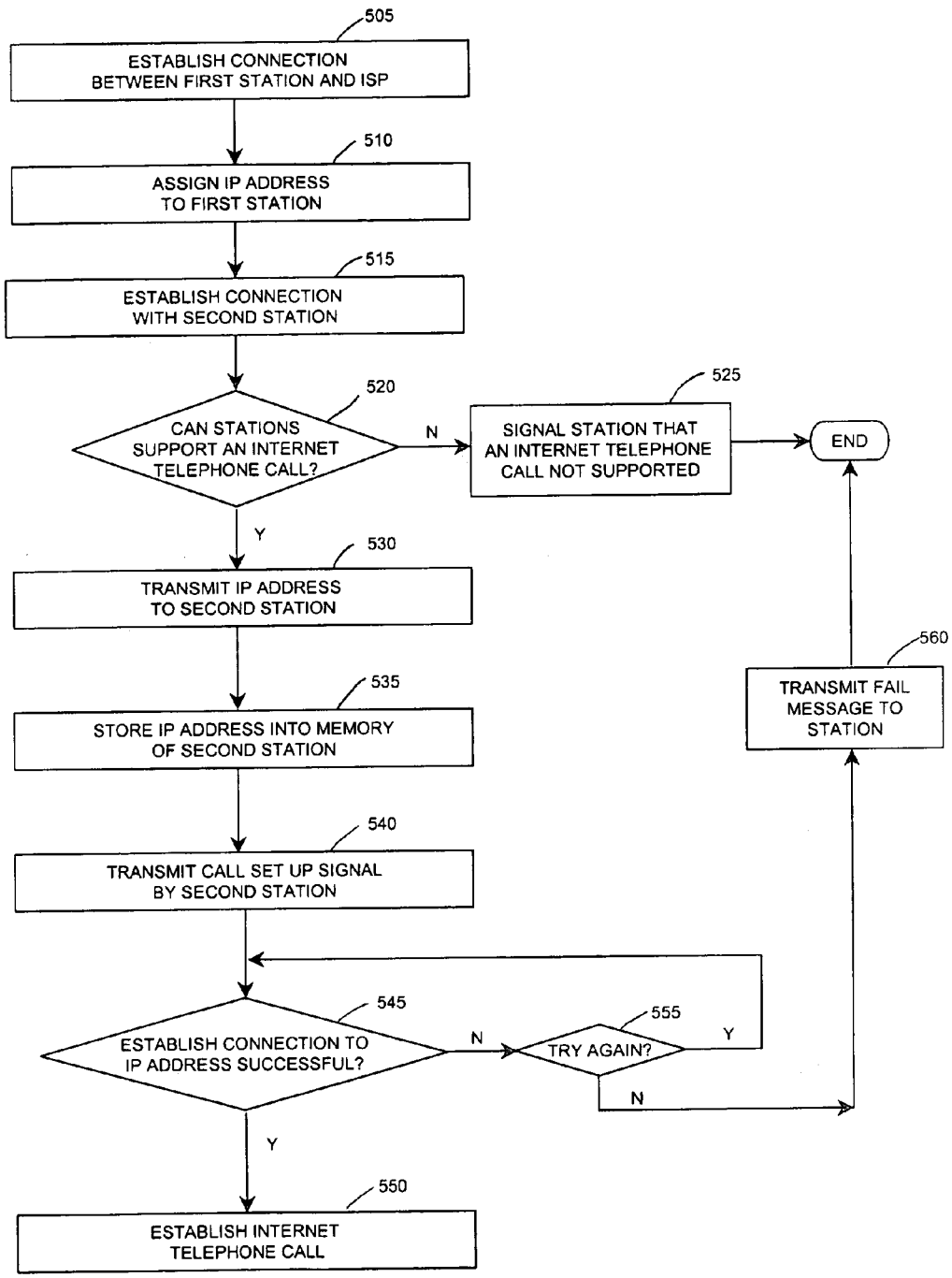
FIG. 13 is a flowchart showing a fourth and yet further alternative embodiment of the method of negotiating a telephone call over a data network in accordance with FIG. 2e.

With reference to FIGS. 2e and 13, in another embodiment of the call negotiation scheme, the first and second Internet telephones 16, 18 can establish a voice communication channel over the Internet 12 without performing a search of the database 52.

The block 505 indicates that a communication channel is established between the first Internet telephone and its associated ISP 28. Specifically, the call initialization module 100 of the first Internet telephone 16 accesses the ISP 28 by using a dial-up modem. The call response module 102 can then determine whether a connection has been established between the first Internet telephone 16 and the ISP 28. After connecting to the ISP 28, the first Internet telephone 16 will place subsequently received telephone calls "on hold" so as not to interfere with the call negotiation process.

At block 510, the ISP 28 assigns the first Internet telephone 16 an IP address which is sent to the first Internet telephone 16 and stored by the IP address transmission/receipt module 110. Next the process flows to block 515 where the first Internet telephone 16 establishes a connection with the second Internet telephone 18. Substantially similar to the call negotiation scheme of FIG. 12, the first Internet telephone 16 connects with the gatekeeper 66, wherein the gatekeeper 66 stores the destination telephone number in its database 116. Based at least in part on the destination telephone number, the gatekeeper 66 will determine the appropriate routing to the gateway 68 serving the second Internet telephone 18. Then a connection is established over the Internet 12 and the PSTN 14, by way of the gateway 68 as indicated by the dashed lines 72.

At decision block 520, it is determined whether the stations can support an Internet telephone call. Substantially similar to the call negotiation scheme of FIG. 10, in one embodiment of the invention, the Internet telephone will make this determination if it detects the other station's capability to do so. For example, the Internet telephone compatibility module 104 can detect the other station's capability to support Internet telephony by signaling the destination station and then receiving an appropriate response signal, or acknowledgement.

If the answer to decision block 520 is no, then the process moves to block 525 wherein the subscriber is made aware that the communication channel must route over a circuit switched telephone network 14 since the other station cannot support Internet telephone calls. Otherwise, the process moves to block 530 where the code transmission/receipt module 108 of the first Internet telephone 16 transmits a code, such as its IP address, to the second Internet telephone 18.

Next at block 535, the second Internet telephone 18 stores the code in the memory unit 84. The code transmission/receipt module 108 of the second Internet telephone 18 then transmits an acknowledgement signal back to the first Internet telephone 16. In one embodiment of the invention, the acknowledgement signal is transmitted back to the Internet telephone 16 without having to take the second Internet telephone 18 off-hook, thereby the first subscriber can avoid incurring the telephone charges associated with placing that call. For example, the Internet telephone can identify the call as being initiated from another Internet telephone by using out-of-band signaling, such as SS7 signaling.

In response to receipt of the acknowledgement signal, at block 540, the first Internet telephone 16 sends call setup signals to establish the Internet telephony link. For example, the network selection module 106 transmits the call setup signals, wherein the Internet 12 is selected to establish a communication channel between the first and second Internet telephones 16, 18. However, it must be determined whether such link has been successfully established (decision block 545). If so, the process moves to block 550 where the first and second Internet telephones 16, 18 can conduct real-time voice conversations over the Internet 12.

Otherwise, the process moves to decision block 555, wherein it is decided whether or not to re-attempt establishing the Internet telephony link. A successful link will be attempted a predetermined number of times, the process looping back at each attempt to decision block 545. If such link is not established after the predetermined number of attempts, the Internet telephones 16, 18 indicate the failure to the subscribers (block 560). In one embodiment, having failed to successfully establish the Internet telephony link, the Internet telephones 16, 18 can be programmed to automatically select a telephony service provider based on a prioritized list and then establish a voice telephone call. Substantially similar to the call negotiation schemes of FIGS. 10 and 11, the Internet telephones 16, 18 can be programmed to then automatically select a telephony service provider based on a prioritized list and establish a voice telephone call.

The present invention concerns a method and communication system for providing voice communication over the Internet. It is within the scope of the present invention that the call negotiation schemes of FIGS. 10–13 are performed by activating a single means. While the invention has been described in detail with reference to the preferred embodiments thereof, it will be apparent to one skilled in the art that various changes and modifications can be made and equivalents employed without departing from the present invention.

We claim:

1. A method for establishing voice communication between a first station and a second station, the method comprising the steps of:

receiving, at a second station, a code transmitted by a first station, wherein the code uniquely identifies the first station;

establishing a communication channel between the first station and a data network having a network server, the network server assigning a data network address to the first station;

identifying, at the second station, the data network address of the first station based at least in part upon the code;

storing the code and the data network address into a memory;

retrieving, at the second station, the data network address of the first station by searching the memory for the code;

determining whether the first and second stations can support a communication channel for voice communication over the data network; and establishing a communication channel between the first station and the second station for voice communication over the data network, using the data network address of said first station, if the first and second stations can support a communication channel for voice communication over the data network.

2. The method of claim 1, further comprising the steps of:
   determining whether the code is invalid; and
   disconnecting the communication channel between the first station and the data network if the code is invalid.

3. The method of claim 1, further comprising the steps of:
   determining whether the first and second stations have established a communication channel over the data network; and
   if it is determined that the first and second stations have not established a communication channel over the data network, then automatically establishing a communication channel between said first and second stations using a circuit switched network.

4. The method of claim 3, wherein the step of establishing a communication channel between said first and second stations using a circuit switched network further comprises the step of:
   selecting a service provider for the communication channel from a provider list associated with the first station.

5. The method of claim 1, wherein the first station connects to the data network automatically in response to a single activation means.

6. The method of claim 5, wherein the single activation means is a programmable button depression signal.

7. The method of claim 5, wherein the single activation means is a voice signal.

8. A first station for initiating voice communication with a second station over a first network and a second network, the first station being a telephonic device comprising:

a storage medium having stored therein a plurality of programming modules including a code module and a call initialization module, wherein the call initialization module is operable to initiate a call to a second station over a first network; and a single activation means for causing the code module to transmit a code to the second station when the single activation means has been activated, the code routing over the first network, wherein the call initialization module of the second station is operable to, in response to receiving the code, transmit an establish-communication-channel command which causes a communication channel to be established between the first and second stations over a second network based at least in part on the code, and if said single activation means has not been activated, the communication channel being established between the first and second stations over the first network, wherein the first network comprises a circuit switched network.

9. The first station of claim 8, wherein the code module transmits a code uniquely identifying the first station.

10. The first station of claim 8, wherein the storage medium further comprises a response module, the response module receiving a response signal from the second station wherein the call initialization module of the first station is operable to transmit an establish-communication-channel command for enabling a communication channel to be established between the first and second stations over the second network in response to the response module receiving the response signal.

11. The first station of claim 8, wherein the first network includes a data network and an IP gateway providing access to the circuit switched network serving the second station.

12. The first station of claim 8, further comprising:
a compatibility module for determining whether the second station supports a communication channel for voice communication over the second network, the compatibility module having a signaling unit and a detector unit.

13. The first station of claim 8, further comprising:
a network selection module for establishing a communication link with the second station if it is determined the communication channel is not established over the second network, said communication link to be established over the circuit switched network.

14. The first station of claim 13, wherein the communication link is established based on a provider list associated with said network selection module.

15. The first station of claim 8, wherein the second network is a data network.

16. The first station of claim 8, further comprising a user interface unit located at the first station, the user interface unit for indicating and selecting a calling feature option which said first station performs.

17. The first station of claim 16, wherein the user interface unit accesses a network server for modifying the calling feature option which the first station performs.

18. The first station of claim 16, wherein the user interface is an interactive voice response application.

19. The first station of claim 16, wherein the user interface is a visual display unit.

20. A method for establishing voice communication between a first station and a second station using a first network and a second network, the method comprising the steps of:
receiving a data network address for a first station at a second station via a first communication channel in a first network, the data network address identifying the first station;
determining whether the first station and the second station can support a communication channel for voice communication over the second network;
disconnecting the first station and the second station from the first communication channel, in response to determining that the first station and the second station support voice communication over the second network;
initiating a second communication channel over the second network between the first station and the second station for voice communication, based on at least the data network address received at the second station;
determining whether the first station and the second station have established the second communication channel over the second network; and
establishing a third communication channel between the first station and the second station using a circuit switched network, in response to determining that the first station and the second station have not established the second communication channel over the second network.

21. The method of claim 20, wherein the step of determining whether the first station and the second station can support a communication channel for voice communication over the second network further comprises the steps of:
signaling the second station from the first station; and
determining whether the first station receives an appropriate response signal from the second station.

22. A method for establishing voice communication between a first station and a second station using a first network and a second network, the method comprising the steps of:
receiving a data network address for a first station at a second station via a first communication channel in a first network, the data network address identifying the first station;
disconnecting the first station and the second station from the first communication channel;
initiating a second communication channel over the second network between the first station and the second station for voice communication, based on at least the data network address received at the second station;
determining whether the first station and the second station have established the second communication channel over the second network; and
establishing a third communication channel between the first station and the second station using a circuit switched network, wherein the circuit switched network comprises at least a portion of at least one of the first network, the second network, and a third network, in response to determining that the first station and the second station have not established the second communication channel over the second network.

23. The method of claim 22, wherein the step of establishing the third communication channel between the first station and the second station using a circuit switched network further comprises the step of:
selecting a service provider for the third communication channel from a provider list associated with the first station.

24. A method for establishing voice communication between a first station and a second station using data networks, the method comprising the steps of:
receiving a code from a first station at a second station, wherein the code identifies the first station;
establishing a communication channel between the first station and a data network having a network server, the network server assigning a data network address to the first station;
identifying, at the second station, the data network address of the first station based at least in part upon the code;
establishing a communication channel between the first station and the second station for voice communication over the data network, based on at least the data network address of the first station;
determining whether the code is invalid; and
disconnecting the communication channel between the first station and the data network, in response to determining that the code is invalid.

25. The method of claim 24, further comprising determining whether the first station and the second station can support a communication channel for voice communication over the data network, and wherein establishing a communication channel between the first station and the data network comprises establishing a communication channel between the first station and the data network, in response to determining that the first station and the second station can support a communication channel for voice communication over the data network.

26. The method of claim 24, further comprising the steps of:
determining whether the first station and the second station have established a communication channel over the data network; and establishing a communication channel between the first station and the second station using a circuit switched network, in response to determining that the first station and the second station have not established a communication channel over the data network.

27. A method for establishing voice communication between a first station and a second station, the method comprising the steps of:
   receiving a code from a first station at a second station, wherein the code identifies the first station;
   establishing a communication channel between the first station and a data network having a network server in response to determining that the first station and the second station can support a communication channel for voice communication over the data network, wherein the network server assigns a data network address to the first station;
   identifying, at the second station, the data network address of the first station based on at least the code;
   determining whether the first station and the second station can support a communication channel for voice communication over the data network; and
   establishing a communication channel over the data network between the first station and the second station for voice communication, based on at least the data network address of the first station, in response to determining that the first station and the second station can support a communication channel for voice communication over the data network.

28. The method of claim 27, further comprising the steps of:
   determining whether the first station and the second station have established a communication channel over the data network; and
   establishing a communication channel between the first station and the second station using a circuit switched network, in response to determining that the first station and the second station have not established a communication channel over the data network.

29. The method of claim 28, wherein the step of establishing a communication channel between the first station and the second station using a circuit switched network further comprises the step of:
   selecting a service provider for the communication channel from a provider list associated with the first station.

30. A method for establishing voice communication between a first station and a second station using data networks, the method comprising the steps of:
   receiving, at a second station, a code transmitted by a first station, wherein the code uniquely identifies the first station;
   establishing a communication channel between the first station and a data network having a network server, the network server assigning a data network address to the first station;
   identifying, at the second station, the data network address of the first station based on at least the code;
   establishing a communication channel between the first station and the second station for voice communication over the data network, based on at least the data network address of the first station;
   determining whether the first station and the second station have established a communication channel over the data network; and
   establishing a communication channel between the first station and the second station using a circuit switched network, in response to determining that the first station and the second station have not established a communication channel over the data network.

31. The method of claim 30, wherein the step of establishing a communication channel between the first station and the second station using a circuit switched network further comprises the step of:
   selecting a service provider for the communication channel from a provider list associated with the first station.

* * * * *